United States Patent [19]

Nakatani

[11] Patent Number: 4,562,985
[45] Date of Patent: Jan. 7, 1986

[54] PAN HEAD
[75] Inventor: Koma Nakatani, Tokyo, Japan
[73] Assignee: Velbon International Corporation, Torrance, Calif.
[21] Appl. No.: 643,832
[22] Filed: Aug. 23, 1984
[51] Int. Cl.⁴ .......................................... F16M 11/12
[52] U.S. Cl. ................................... 248/183; 248/278; 403/370
[58] Field of Search .............. 248/183, 184, 185, 186, 248/278; 403/370; 354/81, 293, 294
[56] References Cited
U.S. PATENT DOCUMENTS
2,524,473 10/1950 Pasturczak ......................... 248/183
2,692,756 10/1954 Lincoln ............................ 248/278 X
4,068,858 1/1978 Harrison et al. ................ 403/370 X
4,249,817 2/1981 Blau ................................ 248/183 X FOREIGN PATENT DOCUMENTS
2852034 7/1979 Fed. Rep. of Germany ...... 248/183
884422 12/1961 United Kingdom ................ 248/183

Primary Examiner—J. Franklin Foss
Assistant Examiner—David L. Talbott
Attorney, Agent, or Firm—Beehler, Pavitt, Siegemund, Jagger & Martella

[57] ABSTRACT

The pan head consists of a single tube for supporting the tilt arm and the table in mutual rotatable relationship. A knob is attached to the rod for retaining the table and tilt arm against separation by withdrawal of the axis tube from its bore and also for urging the tapered pieces into the open end of the tube for interlocking the table and tilt arm.

4 Claims, 1 Drawing Figure

PAN HEAD

BACKGROUND OF THE INVENTION

1. Field of the Invention

The present invention pertains generally to the field of pan heads of the type commonly used with tripod supports in photographic and cinematographic applications, and more particularly is directed to improvements in the hinge assembly for pivotal mounting of the pan head components.

2. State of the Prior Art

The present invention improves over a particular type of pan head which has a table for supporting a camera or other instrument mounted to a tilt arm. More specifically, the table of the prior art pan head assembly was mounted for pivotal movement to a tilt arm by means of a hinge structure comprising a pair of spaced apart hinge portions extending from the table, and a single portion integral to the tilt arm and interposed between the two table lobes. The three hinge portions were secured by means of a pivot tube extending through aligned bores in the three hinge portions. The pivot tube was fixed by a friction fit to the middle lobe, i.e., the lobe integral with the pivot arm while being rotatable within the bores extending through the table lobes on either side of the tilt arm lobe. The portions of the pivot tube extending through the table lobes were slotted in an axial direction at a plurality of circumferentially spaced locations, typically four locations spaced 90 degrees apart, and a tapered nut was fitted into each end of the pivot tube. The tapered nuts weere mounted on a rod which was threaded into one of the nuts and freely rotatable relative to the other nut, but provided with an end knob such that when the rod was rotated by means of the end knob the two tapered nuts were urged together into the opposite ends of the pivot tube causing the tube to enlarge in diameter at each end within the bores in the table lobes. Such enlargement of the pivot tube caused frictional locking between the tube and the table, thus in effect locking the table and the tilt arm against pivotal movement.

In the prior art pan head it was necessary to fix the pivot tube securely to the tilt arm lobe so as to firmly lock together the tilt arm with the table when the ends of the pivot tube were locked within the table lobes. It was found, however, that it was difficult to reliably secure the pivot tube to the tilt arm while using economical assembly methods. It was also found that the number of parts required for such pan head assembly was excessive and resulted in a relatively complex assembly procedure.

SUMMARY OF THE INVENTION

According to the present invention an improved, simplified pan head assembly of more economical construction and reliable operation comprises a table, a tilt arm, a pivot tube affixed at one end to either the table or the tilt arm, the free end of the tube being open and rotatable within a bore formed in the other of the table or the tilt arm. A locking rod is threaded at one end for threading into and out of the part to which is affixed the pivot tube, i.e., the table or the tilt arm. A single body of tapering cross section is supported on the rod such that the tapered body is pressed into the open end of the pivot tube by the rod when the rod is threaded into the table or the tilt arm as the case may be, thus dilating the diameter or cross section of the pivot tube within the bore to thereby lock together the table and the tilt arm against rotation about the pivot tube.

This improved pan head structure eliminates one of the tapered nuts used in the prior art pan head, and furthermore greatly facilitates securing the pivot tube to one of the tilt arm of the table since the pivot tube is fixed at one end to such a part, rather than being fixed at an intermediate point of the pivot tube which previously required inserting the tube into the middle lobe of the hinge, i.e., the tilt arm lobe, and then affixing the tube to the middle lobe. Such methods of the prior art often resulted in the pivot tube slipping within the middle lobe, thus preventing secure locking of the pan head elements. According to the improved pan head assembly the pivot tube is readily permanently secured to one of the pan head parts, thus preventing eventual separation and slippage of the tube.

The improved pan head assembly thus reduces the number of parts required and the steps necessary for assembly of the pan head, as well as increasing the resistance of the pan head to abuse often inflicted to such pan heads during transport and field use by photographers.

DETAILED DESCRIPTION OF THE PREFERRED EMBODIMENT

Figure 1:
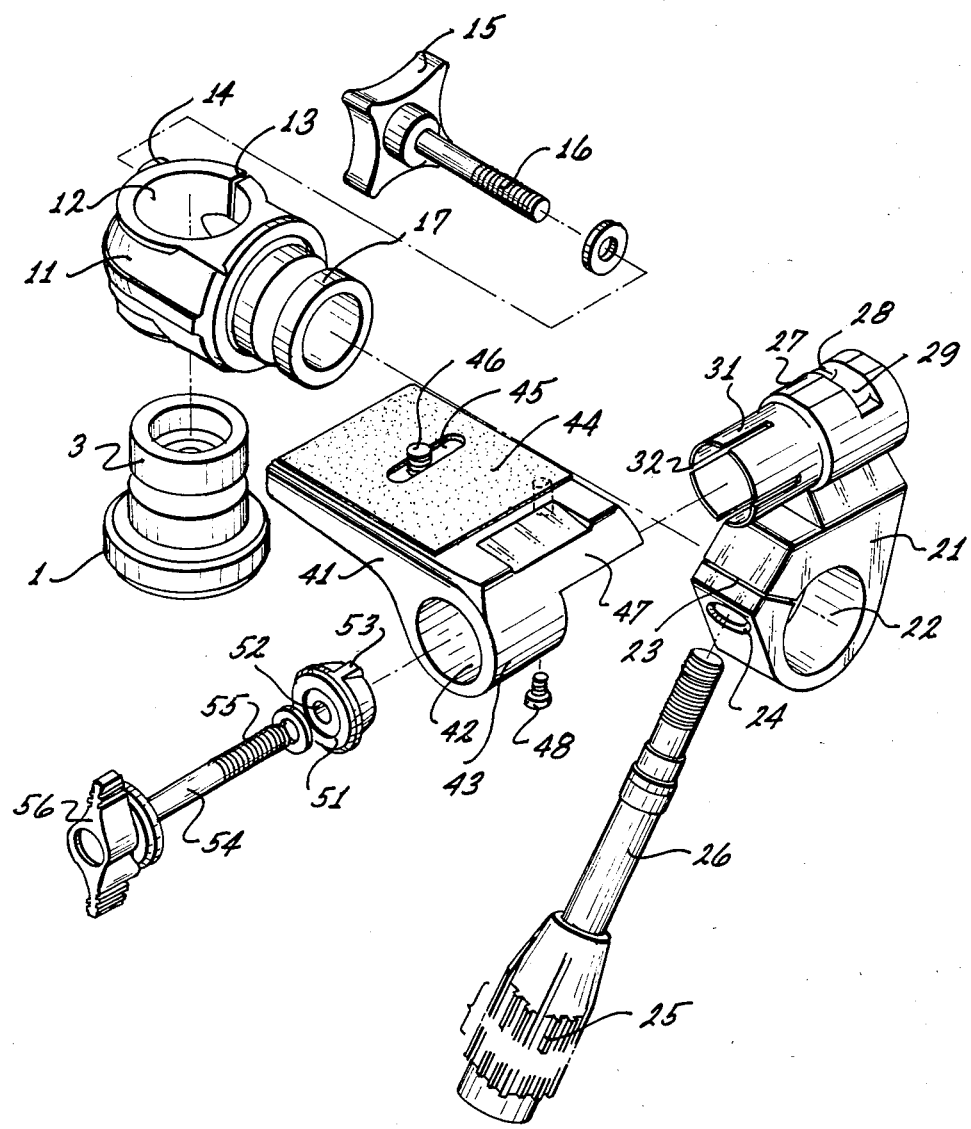
FIG. 1 is an exploded view of the improved pan head.

With reference to the drawings the improved pan head comprises a base 1 which has a threaded hole in its underside open (not visible in the drawing) into which can be screwed the upper part of a tripod support, and a cylindrical panning axis 3 extending from the upper side of the base 1. A panning sleeve 11 rotatable in a horizontal plane about the base 1 is slitted at 13 and provided with a tangential threaded bore 14 which extends across the slit 13. A panning screw 16 provided with a knob 15 is screwed with the bore 14 so as to tighten or release the slitted panning sleeve 11 relative to the base 1. In the released position, i.e., with the slit 13 open, the sleeve 11 is free to rotate about the pan axis 3. By tightening the screw 16, the slit 13 is drawn closed so that the sleeve 11 is tightened about the pan axis 3 thus fixing the sleeve 11 in a particular position relative to the base.

An adjustable tilt arm 21 has a tilt axis bore 22 which receives the tilt axis 17 attached to the panning sleeve 11, such that the tilt arm 21 is pivotable in a vertical plane perpendicular to the panning plane. The tilt arm 21 is also provided with a slit 23 and a threaded bore 24 which extends transversely to the slit 23 through the tilt arm 21 and generally tangentially to the bore 22. A tension adjustment screw 26 provided with a handle 25 is threaded into the hole 24 allowing tightening and release of the tilt arm 21 relative to the tilt axis 17 by drawing the slit 23 closed to reduce the diameter of the bore 22 and releasing the slit for resilient expansion of the arm 21 as required.

The adjustable tilt arm 21 further includes a hinge portion 27 which is generally cylindrical and affixed horizontally to the upper portion of the tilt arm 21. The portion 27 is part of a side-tilt hinge which pivotably retains a platform or table 41 to the tilt arm. The hinge allows the table 41 to rotate about an axis which is perpendicular to both the tilt axis and the panning axis, thereby allowing an instrument, such as a camera, mounted to the table 41 three independent degrees of freedom relative to the base 1.

The hinge portion 27 has a concave radial slot 29 which defines an end stop 28, and further includes a threaded axial hole 38 aligned with the side tilt axis of the table 41. The hinge assembly further comprises a side tilt axis tube 31 axially aligned with the threaded hole 30 and hinge portion 27. The axis tube 31 is affixed at one end to the hinge portion 27, and has a free end in which are cut four circumferentially equidistant slots 32. These slots allow the free end of the tube to be dilated in diameter. Preferably the free end of the axis tube is flaired so as to impart a slight taper to the inside surface of the tube from the open end inwardly.

The table 41 is provided with a second hinge portion 43 in which is defined a bore 42 dimensioned for snugly receiving the side tilt axis tube 31. The top 44 of the table 41 supports a camera or other instrument to be mounted on the pan head. Such an instrument is secured to the mounting surface 44 by means of a screw 46 extending through a slot 45. The screw 46 is threaded into the underside of the camera, and is tightened from underneath the table 41. The table 41 has a raised edge 47 which serves as a stop against the tilt arm 21 when the table 41 is raised to a vertical position. The table's pivotal motion in the opposite direction, i.e., towards the horizontal, is limited by a platform support screw 48 threaded into the underside of the table 41 such that the head of the screw 48 moves within the slot 29 and abuts against the end stop 28 when the table 41 is brought to a horizontal position relative to the base 1.

A hinge lock assembly comprises a tightener nut 51 which has a smooth hole 52 through which extends a side tilt screw 54. The tightener 51 has a tapered surface as a truncated conical surface facing the open end of the pivot tube 31, and a pair of radially extending indexing wings 53 which slide into a pair of diametrically opposed slots 32 in the pivot tube 31 to hold the nut 51 against rotation. The screw 54 has male threads 55 which screw into the female threaded hole 30 of the hinge portion 27. The opposite end of the screw 54 is provided with a winged knob 56. This screw 54 serves to tighten the platform 41 against pivotal motion relative to the tilt arm 21.

When the side tilt screw knob 56 is turned clockwise in the particular example illustrated, the threaded end of the screw 54 moves into the threaded hole 30 of hinge section 27 so that the tightener 51 is forced by the knob 56 into the end of the axis tube 31. As the wings 53 of the nut 51 move into the slots 32, the open end of the tube 31 is dilated in diameter within the bore 42 defined in the second hinge section 43 of platform 41. Such expansion of the tube 31 creates frictional locking engagement with the hinge portion 43, and thus locks the platform 41 at any desired position relative to the tilt arm 21.

The tilt arm 21 is assembled to the side tilt platform 41 by inserting the axis tube 31 into the side tilt bore 42 in the hinge section 43, and then installing the tapered tightener 51 in the open end of the axis tube 31, and finally threading the end 55 of the side tilt screw 54 into the threaded hole 30 of hinge section 27.

A camera can be mounted to the top surface 44 of the table 41 by means of screw 46 as has been described. The pan head allows the camera to be aimed or positioned by moving each of the pivot elements 11, 21 and 41 up and down, right and left.

The horizontal position of the table surface 44 may be adjusted by means of the platform support screw 48 underneath the table 44. The freedom of movement of the side tilt platform 41 depends on the tightness with which the screw 54 forces the tightener nut 51 into the open end of the axis tube 31. By sufficiently tightening the screw 54 into the threaded hole 30, the table 41 can be locked in position and by unscrewing the screw 54, the table 41 may be readily pivoted about the axis tube 31.

In an alternative embodiment of the invention the side tilt screw 54 may have a smooth, unthreaded end freely rotatable but secured against axial withdrawal from the hinge portion 27, and threaded into the hole 52 of the tightener nut 51. Thus, as the screw 54 is rotated within the hinge section 27 the nut 53 is displaced along the screw 54 into and out of engagement with the axial slots 32 of the axis tube 31.

The screw 54 may be replaced by a variety of alternate means for bringing the tapered nut 51 into and out of engagement with the slotted end of the pivot tube 31, and the invention is therefore not limited to use of a screw 54 for such purpose.

It is also equally effective to mount the pivot tube 31 to the hinge portion 43 of the platform 41, while providing a side-tilt bore in the tilt arm hinge portion 27.

It will be understood that the relative sequence of the various pivot axes may be changed, that is, the tilt arm 21 may be pivotally affixed to the top end of the tripod, the panning axis assembly being then mounted to the tilt arm 21, and the side-tilt hinge portion 27 being secured to the panning sleeve 11 instead of the tilt arm 21. The present invention thus extends to any pan head configuration wherein a hinge assembly includes an axis tube 31 affixed at one end to a hinge portion such as portion 27, and lockable to a second hinge portion such as hinge portion 43 by means of a tapered tightener element, e.g., nut 51.

The hinge assembly of this invention allows a reduction in parts required for assembly of a pan head, thus reducing cost by facilitating manufacture of the pan heads. Furthermore, the fixing of the pivot tube 31 at one end substantially increases the reliability and the longevity of the hinge.

While a particular embodiment of the invention has been shown and illustrated for purposes of clarity, it will be understood that many changes, substitutions, and alterations may be made to the described embodiment by those possessed of ordinary skill in the art. Therefore, the scope of the invention is limited only by the following claims:

What is claimed is:

1. A pan head comprising;
   a table;
   a tilt arm;
   a single tube affixed at one end to one of said table or said tilt arm and having a free open end, an axis bore formed in the other of said table or said tilt arm for receiving said axis tube such that said other is rotatable about and supported on said tube;
   a rod extending within said tube and connected at an inner end to said one, said rod having a knob attached to an outer end, said knob cooperating with said other to prevent separation of said one from said other and consequent withdrawal of said tube from said bore; and
   a body of tapering cross section on said rod, said body being pressed into said open end of the tube responsive to manual rotation of said knob by said rod for dilating the cross section of said tube within said bore when said rod is threaded into said one to thereby lock together the table and the tilt arm against rotation about said tube.

2. The pan head of claim 1 wherein said tube is slotted in an axial direction at its free open end at a plurality of circumferentially spaced locations to thereby allow ready dilation of said tube.

3. The pan head of claim 2 wherein said body of tapering cross section is generally shaped as a truncated cone, said body also having indexing means disposed within one or more of said axial slots in the tube to prevent rotation of said tapered body relative to the tube while allowing relative axial displacement therebetween.

4. The pan head of claim 3 wherein said tube is affixed to said tilt arm and said bore is defined in said table.

* * * * *